United States Patent [19]
Kuhn

[11] Patent Number: 5,148,410
[45] Date of Patent: Sep. 15, 1992

[54] SONAR DETECTOR FOR EXITING PASSENGERS

[76] Inventor: Gerald Kuhn, 12461 Popash Ct., North Fort Myers, Fla. 33903

[21] Appl. No.: 809,798

[22] Filed: Dec. 18, 1991

[51] Int. Cl.[5] ............................................. G01S 15/00
[52] U.S. Cl. .................................................... 367/96
[58] Field of Search ............................ 367/96, 95, 87

[56] References Cited

U.S. PATENT DOCUMENTS 4,706,227  11/1987  DuVall et al. ........................ 367/96

Primary Examiner—Daniel T. Pihulic
Attorney, Agent, or Firm—Caesar, Rivise, Bernstein, Cohen & Pokotilow, Ltd.

[57] ABSTRACT

A sonar detector system for exiting passengers on public conveyances such as buses and trolleys which detects the presence of passengers at unattended exits and opens the exit doors is disclosed. The system employs two sonar transducers/receivers at each door of the exit with narrow, electronically truncated detection zones. The sensors are positioned so as to prevent operation of the doors due to echoes from passengers on the aisle floor of the public conveyance or receipt of echoes from outside the conveyance when the doors are open. It also will not operate the doors when echoes are received from packages or debris in the stairwells of the exits. Special circuitry is used to prevent a sensor from detecting echoes from the transmission of the other sensors at the door or in the conveyance and the system is designed so that the presence of persons who are very close to the senor, i.e. within the dead space of the sonar sensor, can be detected using a single sensor. By automatically closing unattended doors, the system will prevent unauthorized entry of fare evaders through the exit. When used on subway trains, the system also prevents closing of doors on passengers entering or leaving the conveyance.

19 Claims, 5 Drawing Sheets

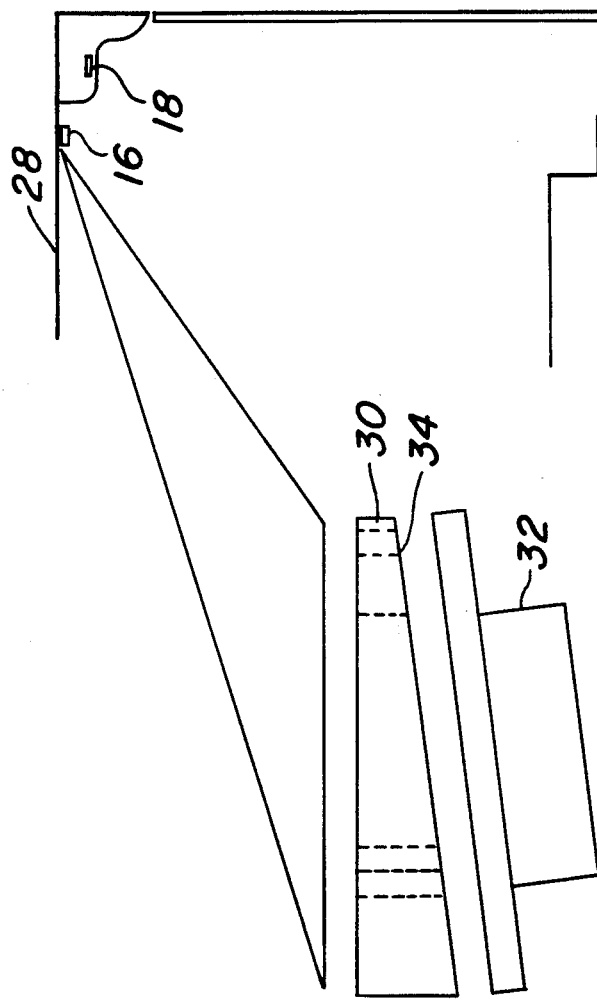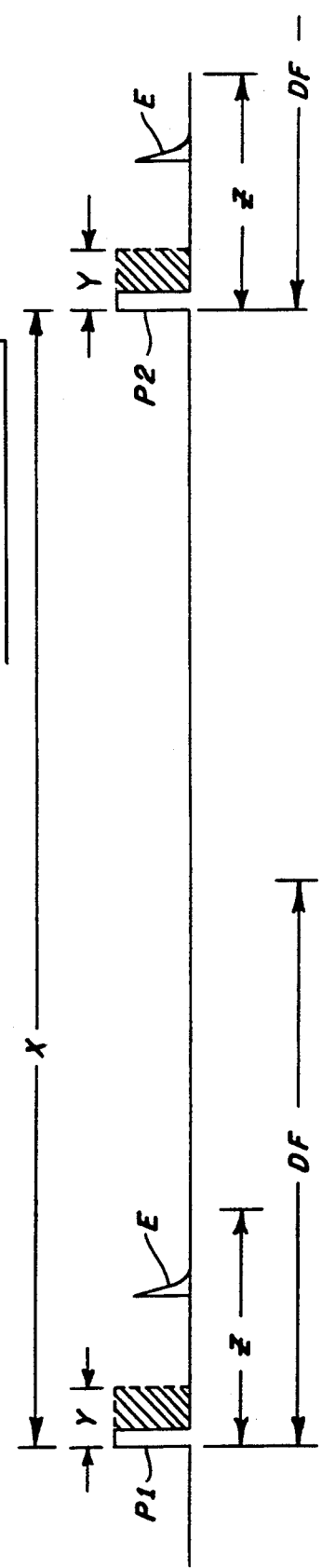

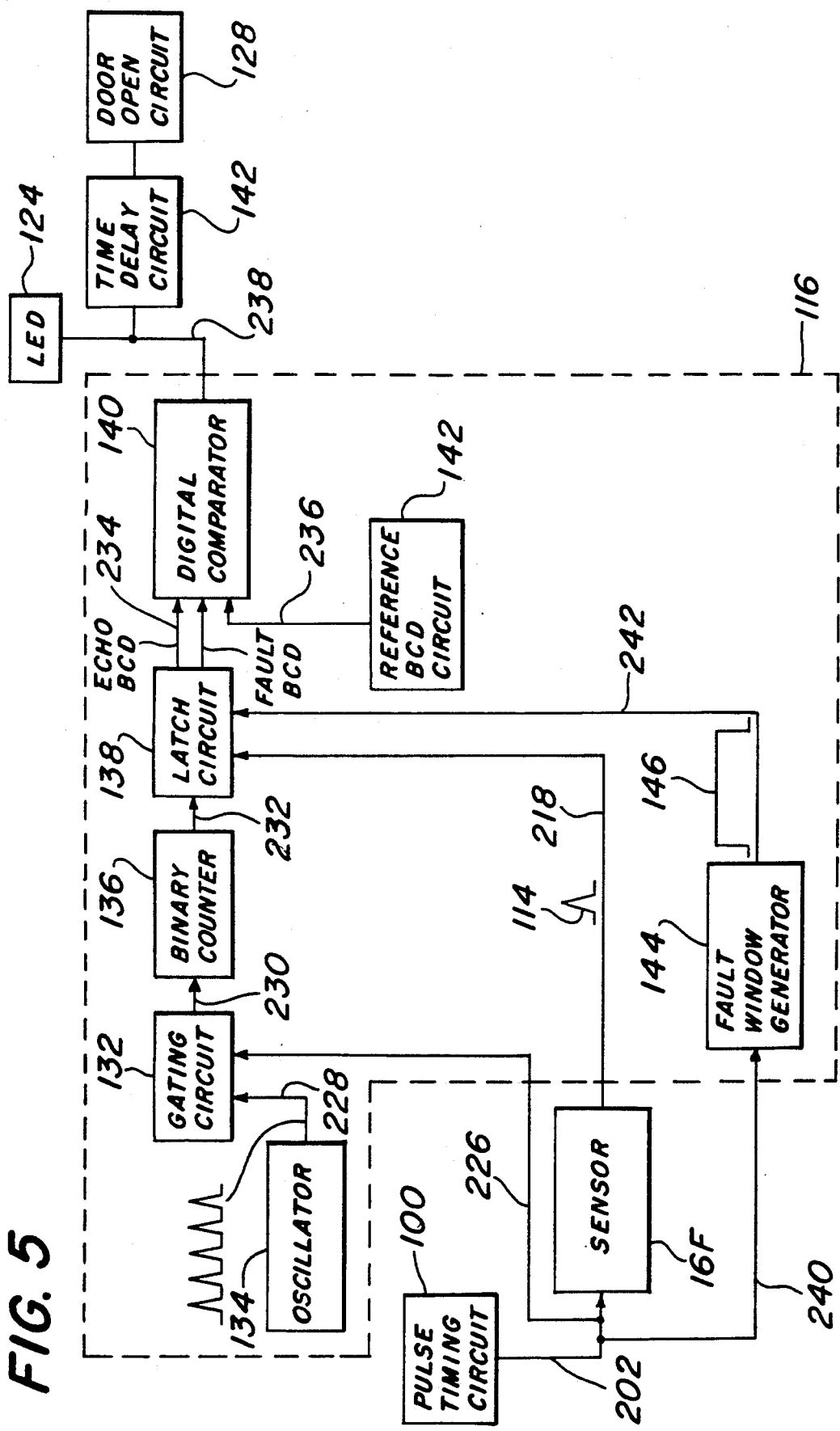

SONAR DETECTOR FOR EXITING PASSENGERS

BACKGROUND OF THE INVENTION

This invention relates generally to systems for detecting exiting passengers on public conveyances and specifically to systems using sonar for detecting the presence of passengers at exits of public conveyances, such as buses or trolley-buses.

At the present time, floormats with micro-switches are in prevalent use to detect the fact that a passenger is at the exit of a bus or trolley-bus. The operation of the micro-switch opens the exit doors for the passengers to leave when the vehicle is brought to a stop. Although the micro-switches will operate to open the door for the exiting passengers, the use of floormats with micro-switches leaves much to be desired. The switches often corrode due to moisture accumulating under the floormats. When the floormats are damaged or the micro-switches cease to operate properly, it is a tedious job to change the floormat and the micro-switch. In order to change the floormat and remove the damaged micro-switch, the doors must be removed, which in some cases necessitates the effort of two people for nine hours. Thus, not only is the repair procedure expensive and time consuming but the vehicle is out of service for an extended period of time.

Generally, other types of devices to detect passengers such as motion detectors are not basically applicable because passengers are stationary while waiting for the door to open. Motion detectors also suffer from vibration and electrical noise within the vehicle will often set off these detectors in the absence of passengers that are exiting. Presence or capacitor types of detector or electric eye, photocell systems are also not suitable because the doors when open are positioned within the stairwell.

This invention enables the use of sonar devices for in a system for detecting exiting passengers in public conveyances which does not have the shortcomings of existing systems as described above.

OBJECTS OF THE INVENTION

Accordingly, it is the general object of the instant invention to provide a sonar detector system for exiting passengers which overcomes the shortcomings of present systems.

It is the further object of the instant invention to provide a sonar detector system for exiting passengers which operates reliably in the presence of electrical noise and vibration.

It is still a further object of the instant invention to provide a sonar detector system for exiting passengers which can detect the presence of passengers no matter how tall or short the passengers may be.

It is still yet a further object of the instant invention to provide a sonar detector system for exiting passengers which does not incorrectly operate due to the presence of packages or debris in the stairwells in the exits of public conveyances.

It is another object of the instant invention to provide a sonar detector system for exiting passengers with narrow beams so that passengers are not detected unless they are in the stairwell of the exits of public conveyances.

It is still another object of the instant invention to provide a sonar detector for exiting passengers with narrow beams which do not give faulty indications when the exit doors are open.

It is still yet another object of the instant invention to provide a sonar detector system for exiting passengers which prevents faulty indications do to echoes from adjacent sonar devices.

It is an additional object of the instant invention to provide a sonar detector system for exiting passengers which is more reliable, and less expensive to operate and maintain than existing detectors.

SUMMARY OF THE INVENTION

These and other objects of the instant invention are achieved by providing a system which detects exiting passengers which utilizes sonar transducers and receivers at the unattended rear door exit of public conveyances such as buses and trolley-buses and subway trains. The system is capable of detecting the presence of passengers in stairwells at the exits, who are tall and are very close (a tenth of an inch or less) to the sonar transducer and receiver while in the stairwell as well as passengers who are shorter. It also will not give faulty indications due to the receiving of sonar echoes in the stairwell caused by packages or debris which has been left in the stairwell. In addition, the automatic closing of the unattended exit doors prevents the unauthorized entry of fare evaders.

DESCRIPTION OF THE DRAWING

Other objects and many of the attendant advantages of this invention will be readily appreciated when the same becomes better understood by reference to the following detailed description when considered in connection with the accompanying drawing wherein:

FIG. 3 is an exploded view showing the upper sensor housing wedge which tilts the sensor housing forward so as to eliminate echoes from passengers standing on the aisle floor.

FIG. 5 is a detailed block diagram showing the basic electronic and electro-mechanical components of the system of the instant invention.

FIG. 6 is a timing diagram showing the transmitted pulses of the sonar transducers and the echoes received by the sensors.

DETAILED DESCRIPTION OF THE PREFERRED EMBODIMENT

Figure 1:
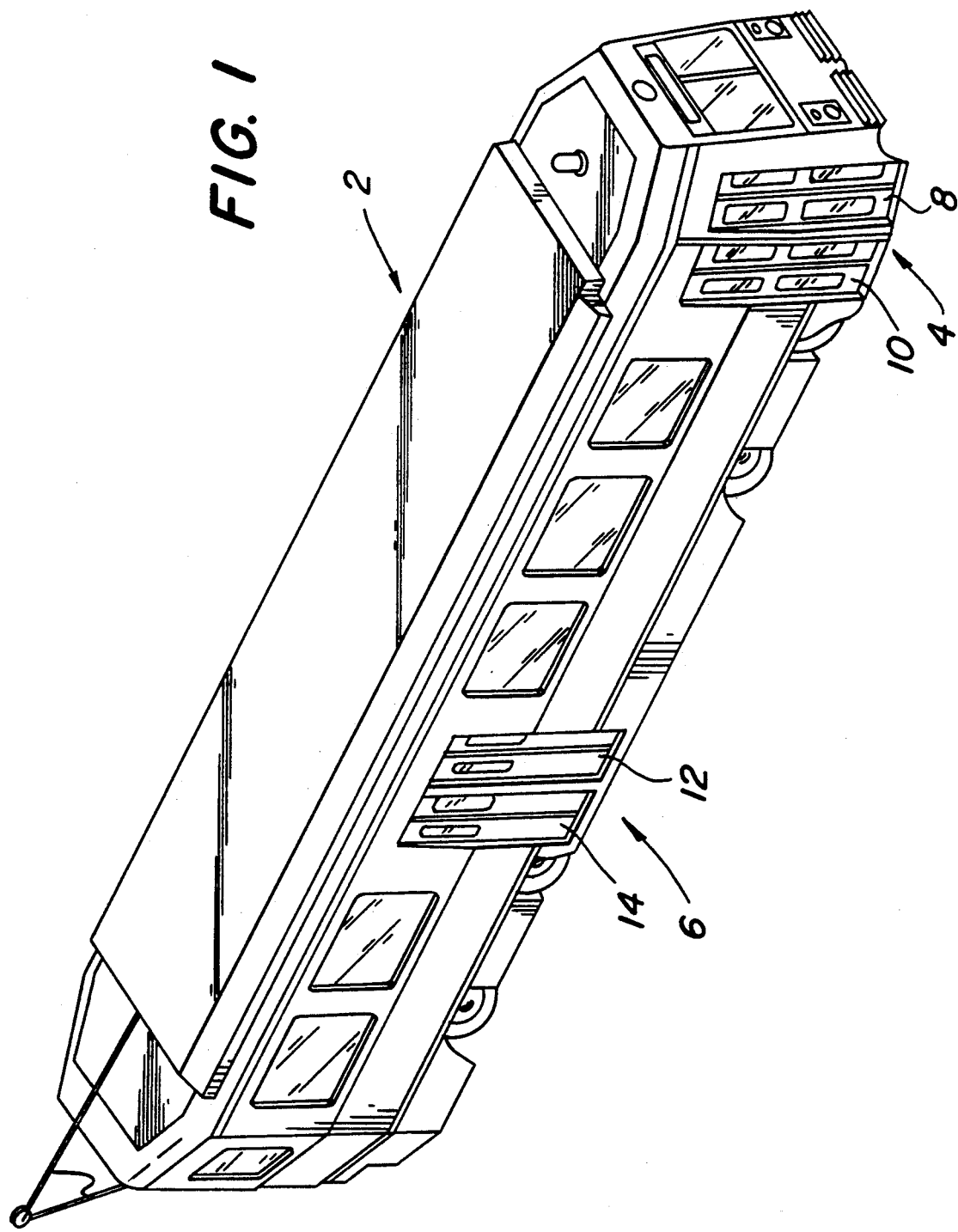
FIG. 1 is a perspective view of a standard type of trolley-bus in present use.

Referring now in greater detail to the various figures of the drawing, wherein like reference characters refer to like parts, there is shown in FIG. 1 a trolley-bus 2 into which the sonar detection system can be installed. The bus 2 has a forward exit 4 and a rear exit 6. The forward exit 4 comprises a pair of accordion-type doors 8 and 10, and the rear exit 6 comprises a pair of accordion-type doors 12 and 14.

Figure 2A:
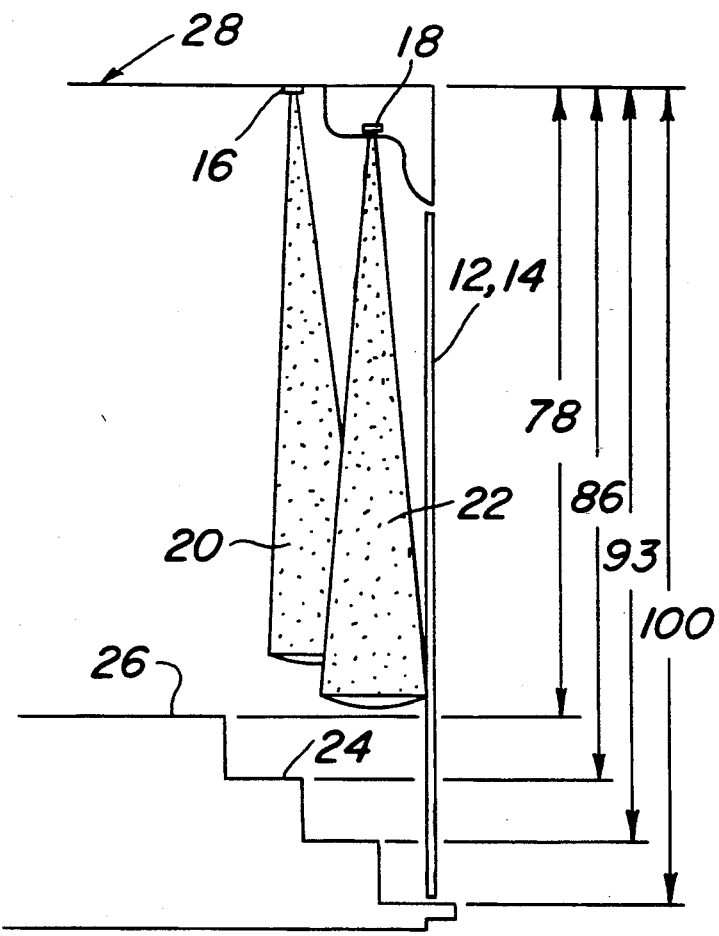
FIG. 2A is a side view of the stairwell and the upper and lower sensors above the stairwells at the rear exit doors of the bus or trolley-bus.
Figure 2B:
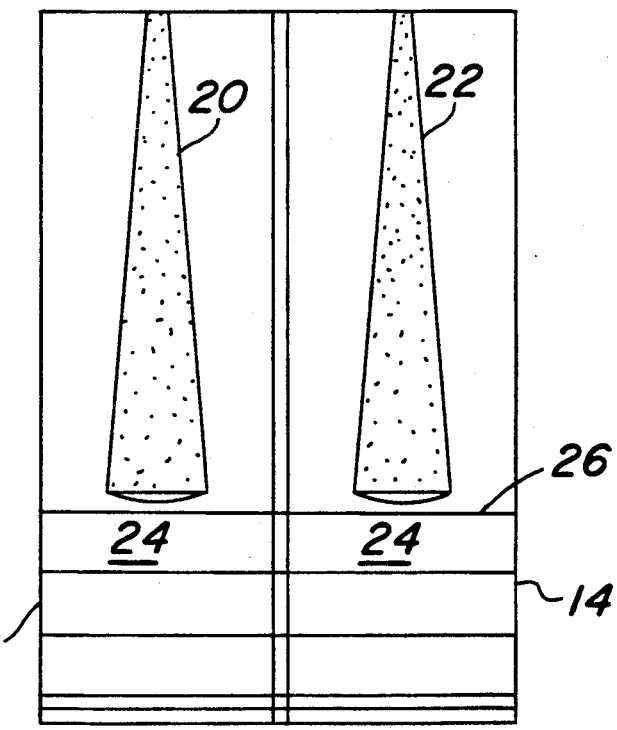
FIG. 2B is an exterior front view of the stairwell at the rear exit doors of the bus or trolley-bus.

Referring now to FIG. 2A, there is shown an upper sensor 16 and a lower sensor 18 at the stairwell 24 leading to the rear exit doors. The upper sensor 16 has a narrow conically-shaped detection zone 20 and the lower sensor 18 similarly has a narrow conically-shaped detection zone 22. The detection zones are truncated electronically as will be explained later. FIG. 2B which is a front view showing the stairwell 24 and the detection zones 20 and 22. There are four sensors at the exit, one sensor 16 and one sensor 18 for each door 12 and 14, respectively. As can be seen, the detection zones 20 and 22 are centered with respect to the stairwell 24.

Referring again to FIG. 2A, it can be seen that the detection zone 20 of the upper sensor 16 is angled toward the door. This is to prevent echoes from occurring when a passenger is on the aisle floor 26 prior to stepping into the stairwell 24 and thereby giving a false indication that a passenger is in the stairwell waiting to exit.

The detection zone 22 of the lower sensor 18 is, on the other hand, directed vertically downward. The narrowness of the detection zone 22 prevent the receipt of echoes from outside the bus when the bus doors are open, and from the doors when they are opening or closing or in the process thereof.

In order to provide a reliable system, as will be discussed in detail later, it is necessary to prevent the receipt of echoes by a sensor generated by the transmission of sound waves from other sensors at the exit or within the vehicle. Furthermore, since all sonar devices have a dead zone during which the transducer must recover after transmitting a pulse, and during which echoes cannot be received, the system must detect the presence of very tall passengers whose heads are very close to the sensors while they are standing in the stairwell. Also, the system must not give false indications and operate the doors improperly if debris or packages are left in the stairwell. Finally, since passengers sometimes carry such items as backpacks, a time delay must be inserted to prevent the doors from closing until the passengers are well clear of the exit doors. The addressing of these problems will be discussed later.

As can be further seen in FIG. 2A, the aisle floor 26 is approximately 78" from the aisle ceiling 28, the bottom of the stairwell 24 is 100" from the aisle ceiling 28, and the tops of the first and second steps of the stairwell 24 are approximately 93 and 85 inches from the bus ceiling 28. The figure shows that the detection zones have been truncated at approximately 6 feet from the sensors 16 and 18. As will be discussed later, the detection zones may be truncated at other predetermined distances. Thus, the detection zones could be truncated 5 feet, which would allow for the placement of larger packages in the stairwell without the creation of false indications.

FIG. 3 shows an exploded view of the upper sensor housing wedge 30 which is used to angle the upper sensor 16 as described with relation to FIG. 2A. One side of wedge 30 is mounted flush with the bus ceiling 28, while the sensor housing 32 of the upper sensor 16 is mounted to the inclined surface 34 of the wedge 30. This angles the detection zone 20 of the upper sensors 16 forward as shown in FIG. 2A.

The system utilizes identical transducer/receiver sonar units with identical housings and electronics for each of the four sensors. To prevent the receipt of echoes by a sensor from other sensors within the vehicle, the electronics of the sensors are wired so that one of the sensors is designated as a master sensor while the other sensors are wired as slaves to the master sensor, as will be explained below in conjunction with FIG. 4.

Figure 4:
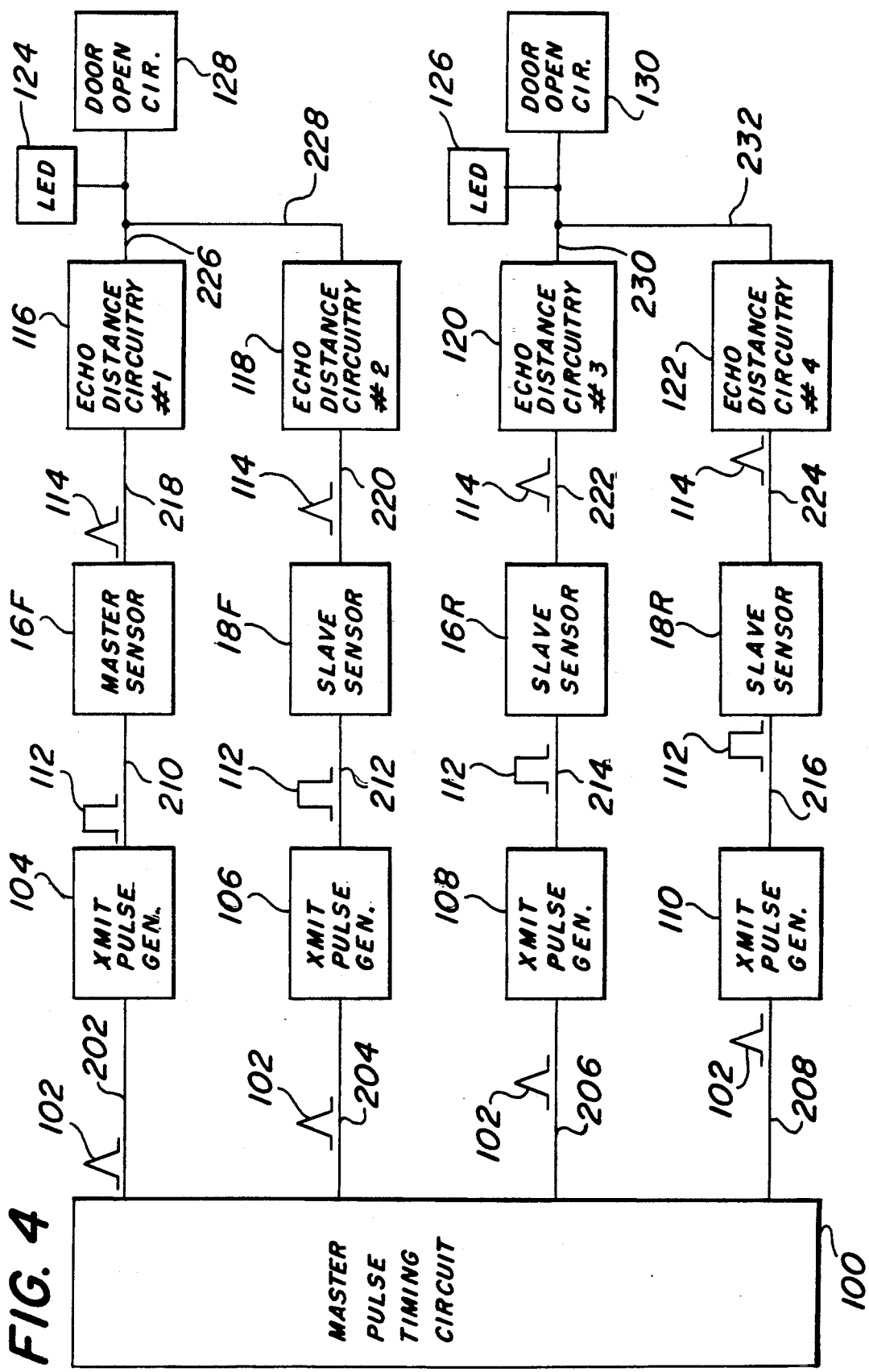
FIG. 4 is an overall block diagram of the system of the instant invention.

Referring now to FIG. 4 which is an overall block diagram of the system, master pulse timing circuit 100 generates a series of pulses 102 in sequence on lines 202, 204, 206 and 208, respectively. These pulses are sent to transmitter pulse generators 104, 106, 108 and 110, respectively. As previously stated, each of the four sensors contains the same circuitry and therefore there is a pulse timing circuit 100 for each sensor. However, when one of the sensors is chosen as the master sensor, its pulse timing circuit is wired to produce pulses for triggering the master sensor plus delayed pulses in sequence which are used to trigger the slave sensors.

The output of the transmitter pulse generators for each sensor is connected to each of the sensor by lines 210, 212, 214 and 216. The transmit pulses 112 are also in sequence and are phased in accordance with the phasing of the timing circuit pulses 102. As will be explained later, the phasing of the master pulse and the three slave pulses is such that the sensors will not receive echoes from other sensors within the vehicle. Any one of the four sensors, two sensors 16 and two sensors 18 at the rear exit can be made the master sensor and the other sensors wired to be slave to the master sensor.

The sensors 16 and 18 can be standard off-the-shelf sonar detection devices such as Type No. 604,142 provided by Polaroid, or equivalent, which meet the requirements of the system for detection zone dimensions. The sensors, 16 and 18, have thin foils which vibrate to transform electrical energy into sound wave and conversely sound waves into electrical energy. The foil is a plastic with a conductive gold coating on the front side that is stretched over metallic aluminum back plate. The back plate has a series of concentric grooves over which the foil is suspended and the foil therefore acts like an electrical capacitor. When charged, an AC voltage of given frequency forces the coil to move at the same frequency to send out sound waves. The large diameter of the transducer, the high frequency used, and an accurate in-phase condition, create a narrow beam for transmission, as well as for reception.

In FIG. 4, the upper sensors are designated as 16F and 18F, respectively, and the lower sensors are designated as 16R and 18R, respectively. The return echoes received by the sensors 16F, 18F, 16R and 18R, if a person is within the stairwell, are transmitted to echo distance circuitry 116, 118, 120, and 122 via lines 218, 220, 222 and 224, respectively. The echo distant circuitry, 116, 118, 120 and 122, digitize the time difference between the transmit pulse for each of the sensors and the received echo and use a digital comparator circuit to determine whether the echo was received within the allowable time limits.

For example, if the echo was not received within the predesignated time, which represents the predesignated distance of 5 of 6 feet, the comparator will not provide an output on lines 226, 228, 230, 232 to operate light emitting diode LED 124 at the rear exit 6.

FIG. 5 shows a block diagram which details the operation of the echo distance circuitry 116 as shown in FIG. 4. It should be kept in mind that although FIG. 5 relates to a master sensor 16F and the circuitry associated with the master sensor, the other sensors 18F, 16R and 18R have identical circuitry. As previously stated, the pulse timing circuitry 100 of the master sensor is used to provide a pulse which generates a transmit pulse to the sensor 16F via line 202.

The output of the pulse timing circuit 100 is also connected to a gating circuit 132 via line 226. The gating circuit is part of the echo distance circuitry 116 as shown in FIG. 4 and its components are enclosed in FIG. 5 by the dashed lines. Oscillator 134 generates a stream of pulses on line 228 which is also connected to the gating circuit 132. The output of the pulse timing circuit on 226 gates the pulse stream on 228 to a binary counter 136 on line 230. The output of the binary counter 136 comprises a 4 bit binary coded decimal signal appearing on lines 232 which are connected to a latch circuit 138.

The return echo 114 appears on line 218 which is connected to the latch circuit 138. When the return echo is received, the count in the binary counter is latched as a 4 bit binary coded decimal signal. The 4 bit binary coded signal which represents the time between the initiation of the transmit pulse and the receipt of the echo is also representative of the distance of the objects which reflect the transmitted energy back to the sensor 16F receiver. For example, if the speed of sound at sea level in air is approximately 760 miles per hour, which is equal to 1100 feet per second, an object 5 feet away from the transmit sensor would create an echo of sound waves at the receiver which have traveled 10 feet. This would take approximately 9 milliseconds in time. Therefore, if each pulse of the oscillator represents one foot distance from the reflecting object to the sensor, the pulses must be nine-fifths of a millisecond apart. This determines that the frequency of the master oscillator should have a period of 1.8 milliseconds or a frequency of approximately 555 cycles per second.

For a five foot indication, the binary coded decimal (BCD) information which comprises 4 bits, would be represented by 1,0,1,0 (the least significant digit first).

The echo BCD from the latch circuit 138 is connected to a digital comparator 140 by lines 234. A reference BCD is also connected to the digital comparator 140 via lines 236. The reference BCD circuit comprises a series of resistors which are either connected to a 5 volt source or to ground. Each of the four inputs to the four bit binary signal for the reference BCD is therefore either connected to 5 volts which represents a "1" or to ground which represents a "0". To reject all echoes which are more than 5 feet away from the sensors, the reference BCD entered into the digital comparator would be 1,0,1,0 (least significant digit first). To change the reference BCD to a distance representing 6 feet the reference BCD would be set for a 4 digit binary coded decimal signal of 0,1,1,0 (least significant digit first).

The digital comparator 140 compares the echo BCD on lines 234 to the reference BCD on lines 236. If the echo BCD is equal to or less than the reference BCD, then the digital comparator 140 generates a signal on line 238 which operates the LED 124 at the exit 6 where the echo was received. If the echo BCD is greater than the reference BCD no signal is generated by the digital comparator 140. The output signal on line 238 is transmitted through time delay circuit 142 and then to door opening circuit 128 which opens the door. As stated previously, the time-delay circuit inserts a time delay, which allows a passenger to be clear of the door after exiting before the door closes. The time delay circuit 142 uses an RC time constant circuit to produce the delay. This operates a transistor driven relay which closes the door open circuit causing the door to open (not shown).

Thus far, the circuitry associated with each sensor 16F, 18F, 16R and 18R has been described with relation to truncating the detection zone at a predetermined distance from the sensor, for example, 5 or 6 feet. However, another problem exists because of the dead time after the initiation of the transmit pulse at the sensor during which echoes cannot be received. The dead time represents approximately 16 inches or 1 and ⅓ feet in distance. Therefore, tall persons, the tops of whose heads are within 16 inches of the sensor would not generate echoes which could be discerned by the system. Present systems for detecting close-in echoes within the dead time require more than one sensor and complex circuitry. However, a unique method is used in the instant invention to indicate to the system that the size of the person has prevented the echo from being received by the sensor.

Referring to FIG. 5, a fault window generator 144, which is triggered by the output of the pulse timing circuit 100 on line 240, produces a fault window 146, with a pulse width of 13 feet. Referring back to FIG. 2A, if there is no one in the stairwell, the sensor will receive reflected echoes from the steps of the stairwell. However, if the output of the sensor is blocked by a person, no such reflections will be received. The latch circuit 38 which receives the fault window pulse 146, on line 242 determines whether an echo has been received within the 13 feet width. If no echo has been received within the 13 feet, i.e., there are no echoes received by the sensor from the stairwell, the latch circuit 138 generates a fault BCD which is less than the reference BCD. This then operates the LED and the door opening circuit.

FIG. 6 is a timing diagram which indicates the various occurrences between transmit pulses. Transmit pulse P1 starts the cycle. The cross-hatched area adjacent to P1 represents the dead area of 16 inches, i.e. Y=16", during which no pulses can be detected by the sensor. The echo being received from the sensor is shown as "E". The distance "X" between the generation of the pulse of the first sensor and the generation of the transmit pulse P2 of the next sensor in sequence, is approximately 50 feet. The distance "Z" represents the reference BCD signal which as stated previously can be varied in foot increments, for example, 5 or 6 feet. The default distance as previously described is 13 feet.

The distance "X" of 50 feet is chosen so that all reflections from the signals generated by other sensors become too weak to be picked up by the next sensor that is being triggered.

The system can be made from standard off-the-shelf items. For example, as stated previously, the sensor may be Type No. 604,142 produced by Polaroid, or equivalent. The oscillator 134 can comprise a chip, Type No. 555 produced by National Semiconductor, or equivalent. The latch circuit can comprise chip Type No. CD4042 produced by RCA, or equivalent.

A system for use of sonar to detect exiting passengers in a public conveyance has been described. The system can detect objects which are immediately below the sensors, i.e. a tenth of an inch or less. It provides for narrow detection zones which are truncated electronically to eliminate reflections from stairwells and packages or debris placed in stairwells at the exits of the conveyances. The system also provides for a time delay in the closing of the door which makes sure that passengers and their belongings are clear of the door prior to the closing, and it prevents the unauthorized entry of fare evaders at unattended exit doors.

Although the embodiment described herein shows a sonar detection system for a trolley-bus, the system is equally applicable for any public conveyance for detecting exiting passengers to operate doors. For example, for use with subway trains, which have flush doors, the sensors could be placed outside and above the doors to determine the presence of passengers entering or leaving the train, so that the doors could not be inadvertently closed on passengers.

Without further elaboration, the foregoing will so fully illustrate my invention that others may be applying current or future knowledge readily adapt the same for use under the various conditions of service.

I claim:

1. A system for detecting passengers exiting from a public conveyance, said system comprising:
   (a) at least one sonar sensor with a transducer which transmits sound waves and receives reflected sound waves, located at an unattended exit door of said conveyance;
   (b) a means for determining whether a passenger is located at said exit door for exiting;
   (c) means for operating said door when said passenger is detected;
   (d) means to prevent spurious echoes and spurious reflections from activating said means for operating said door;
   (e) means for detecting, with a single sensor, the presence of a passenger at said exit door who is too close to said sensor to produce a detectable echo.

2. The system of claim 1 wherein said means to prevent spurious echoes and spurious reflections from activating said operating means comprises means for producing a first signal which represents the distance of the object that produced said echoes from the sensor and means to compare said first signal to a second predetermined reference signal which represents the maximum distance of an object from said sensor, which will allow for the activation of said operating means.

3. The system of claim 2 wherein said first signal and said second signal comprise a binary coded decimal digital signal and said means to compare said first and second signal comprises a digital comparator which produces a third signal to operate to open said door if said first signal is equal to, or smaller than said second signal.

4. The system of claim 3 wherein said system further comprises a light at said exit and said light comprises an LED and said means for operating said door comprises means to light said LED and a relay whose contacts produce a closure for a door opening circuit.

5. The system of claim 4 wherein said means to operate said door further comprises a time delay circuit which prevents closing said door for a predetermined time after said passenger has exited from said bus.

6. The system of claim 5 wherein said at least one sensor at said exit comprises a plurality of sensors and said system further comprises a means to prevent a sensor from receiving a detectable echo produced by any other sensor in said vehicle.

7. The system of claim 6 wherein said means to prevent a sensor from receiving a detectable echo produced by any other sensor comprises a pulse timing circuit which produces a train of pulses, spaced at predetermined time intervals, each of which causes a transmitting pulse generator to trigger each of said sensors in sequence at said predetermined time intervals.

8. The system of claim 7 wherein each of said predetermined time intervals is equal to the time required to receive an echo from an object approximately 50 feet from the sensor producing said echo.

9. The system of claim 8 wherein said means for detecting, with a single sensor, the presence of said passengers at said exit door who are too close to said sensor to produce a detectable echo comprises a means for producing a default window.

10. The system of claim 9 wherein said default window comprises a pulse whose width represents a predetermined default distance.

11. The system of claim 9 wherein said system further comprises a means for determining whether an echo has been received during the duration said pulse and, if said echo is not received during the duration of said pulse, a means to activate said means for operating said light and operating said door.

12. The system of claim 1 wherein said at least one sensor at said exit comprises a plurality of sensors and said system further comprises a means to prevent a sensor from receiving a detectable echo produced by any other sensor in said vehicle.

13. The system of claim 12 wherein said means to prevent a sensor from receiving a detectable echo produced by any other sensor comprises a pulse timing circuit which produces a train of pulses, spaced at predetermined time intervals, each of which causes a transmitting pulse generator to trigger each of said sensors in sequence at said predetermined time intervals.

14. The system of claim 13 wherein each of said predetermined time intervals is equal to the time required to receive an echo from an object approximately 50 feet from the sensor producing said echo.

15. The system of claim 1 wherein said means for detecting, with a single sensor, the presence of said passengers at said exit door who are too close to said sensor to produce a detectable echo comprises a means for producing a default window.

16. The system of claim 15 wherein said default window comprises a pulse whose width represents a predetermined default distance.

17. The system of claim 16 wherein said system further comprises a means for determining whether an echo has been received during the duration of said pulse and, if said echo is not received during the duration of said pulse, a means to activate said means for operating said light and operating said door.

18. The system of claim 17 wherein said system is capable of detecting, with a single sensor, the presence of said passengers who are within one-tenth of an inch from said sensor.

19. The system of claim 15 wherein said system further comprises means to close said door after a predetermined time after said passengers have departed from said exit, to prevent unauthorized entry into said exit.

* * * * *